US00RE35760E

United States Patent [19]

Vaccaro et al.

[11] E Patent Number: Re. 35,760

[45] Reissued Date of Patent: Apr. 7, 1998

[54] METHOD OF MAKING A SCROLL COMPRESSOR PUMP CARTRIDGE SUBASSEMBLY

[75] Inventors: Joseph P. Vaccaro, Bismarck, Ark.; Thomas L. Kassouf, Syracuse, N.Y.

[73] Assignee: Carrier Corporation, Syracuse, N.Y.

[21] Appl. No.: 404,847

[22] Filed: Mar. 15, 1995

Related U.S. Patent Documents

Reissue of:

[64] Patent No.: 5,379,516
Issued: Jan. 10, 1995
Appl. No.: 43,416
Filed: Apr. 6, 1993

[51] Int. Cl.[6] ..... B23P 15/00

[52] U.S. Cl. ..... 29/888.02; 29/426; 29/428; 418/55.2

[58] Field of Search ..... 29/888.02, 426, 29/428; 418/55.1, 55.2; 417/366, 369

[56] References Cited

U.S. PATENT DOCUMENTS

| | | | |
|---|---|---|---|
| 4,649,611 | 3/1987 | Ikeda et al. | 418/55.1 |
| 4,900,238 | 2/1990 | Shigemi et al. | 29/888.022 |
| 5,042,150 | 8/1991 | Fraser, Jr. | 29/888.022 |
| 5,140,747 | 8/1992 | Barnett et al. | 29/888.022 |
| 5,188,520 | 2/1993 | Nakamura et al. | 418/55.1 |

FOREIGN PATENT DOCUMENTS

| | | | |
|---|---|---|---|
| 0193793 | 11/1982 | Japan | 29/888.022 |
| 116201 | 4/1992 | Japan . | |
| 2182394 | 5/1987 | United Kingdom . | |

*Primary Examiner*—Irene Cuda

[57] ABSTRACT

The crankcase, fixed and orbiting scrolls and Oldham coupling are assembled to make a pump cartridge assembly as a subassembly of a scroll compressor. The pump cartridge assembly is tested to determine whether or not it operates satisfactorily. Upon successful testing, the pump cartridge assembly is installed in the shell of a hermetic compressor.

16 Claims, 10 Drawing Sheets

METHOD OF MAKING A SCROLL COMPRESSOR PUMP CARTRIDGE SUBASSEMBLY

Matter enclosed in heavy brackets [ ] appears in the original patent but forms no part of this reissue specification; matter printed in italics indicates the additions made by reissue.

BACKGROUND OF THE INVENTION

In assembling hermetic compressors in general and, specifically, hermetic scroll compressors, assembly is keyed to and takes place within the shell. Commonly assigned U.S. Pat. No. 5,042,150 discloses an assembly method where the stator of the motor is secured in place in the shell and then serves as a reference for locating and securing the upper and lower bearings. With the bearings secured in place, the other members can then be assembled in place. Assembling within the shell requires special fixtures, machining dowel holes, the use of dowels, etc. to permit assembly of the very accurately machined parts. Thus, the assembly that takes place within the shell requires a complicated system for automatic assembly.

SUMMARY OF THE INVENTION

The present invention is directed to assembling a pump partridge as a subassembly of a scroll compressor. The pump cartridge is installed as a unit within the shell of the scroll compressor as part of the assembly of the scroll compressor. This permits easier automatic assembly of the very accurately made scroll members and a more precise alignment of the pump cartridge for more efficient and reliable operation of the scroll members. Further, since the pump cartridge includes the two scroll members, anti-rotation structure and crankcase, the pump cartridge can be tested prior to being installed in the shell.

It is an object of this invention to eliminate the need for machining dowel holes for the assembly of a scroll compressor pump.

It is an additional object of this invention to permit the testing of a pump cartridge assembly prior to its installation in the shell.

It is a further object of this invention to more precisely align a pump cartridge assembly for improved operation of the scroll members.

It is another object of this invention to assemble a scroll compressor pump as a subassembly of a hermetic scroll compressor. These objects, and others as will become apparent hereinafter, are accomplished by the present invention.

Basically, the fixed and orbiting scrolls, the crankcase and the anti-rotation structure are assembled to form a pump cartridge as a subassembly of a scroll compressor. The assembled pump cartridge is tested prior to its being placed in the shell of a scroll compressor as part of the assembly process.

BRIEF DESCRIPTION OF THE DRAWINGS

For a fuller understanding of the present invention, reference should now me bade to the following detailed description thereof taken in conjunction with the accompanying drawings wherein.

DESCRIPTION OF THE PREFERRED EMBODIMENT

Figure 1:
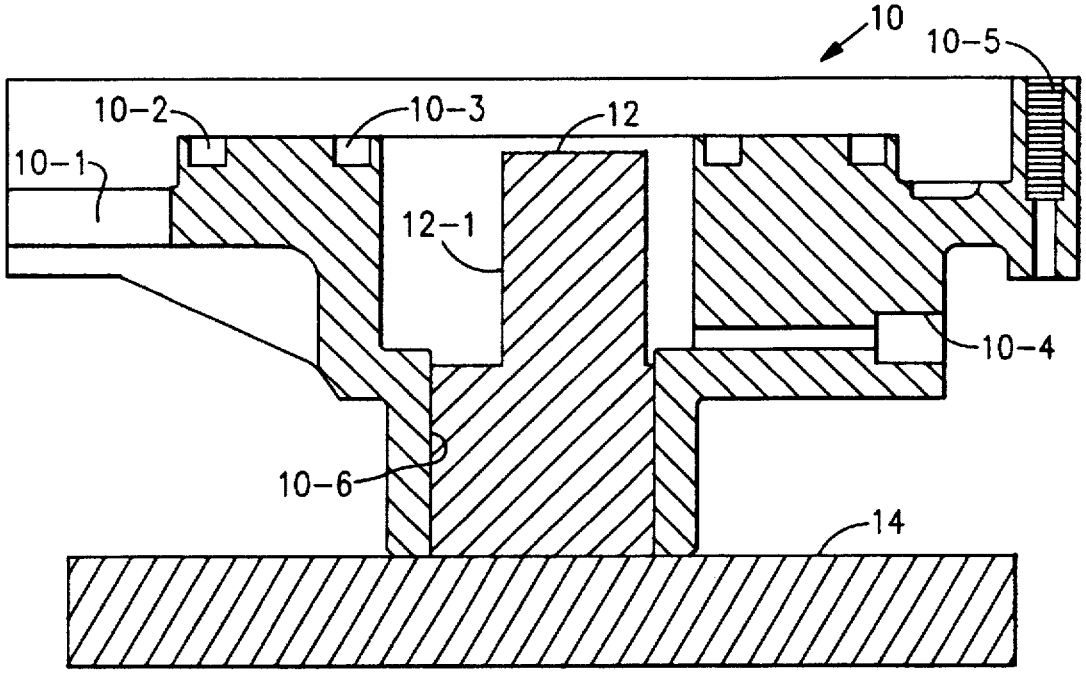
FIG. 1 is a sectional view showing a crankcase located on a fixture.
Figure 2:
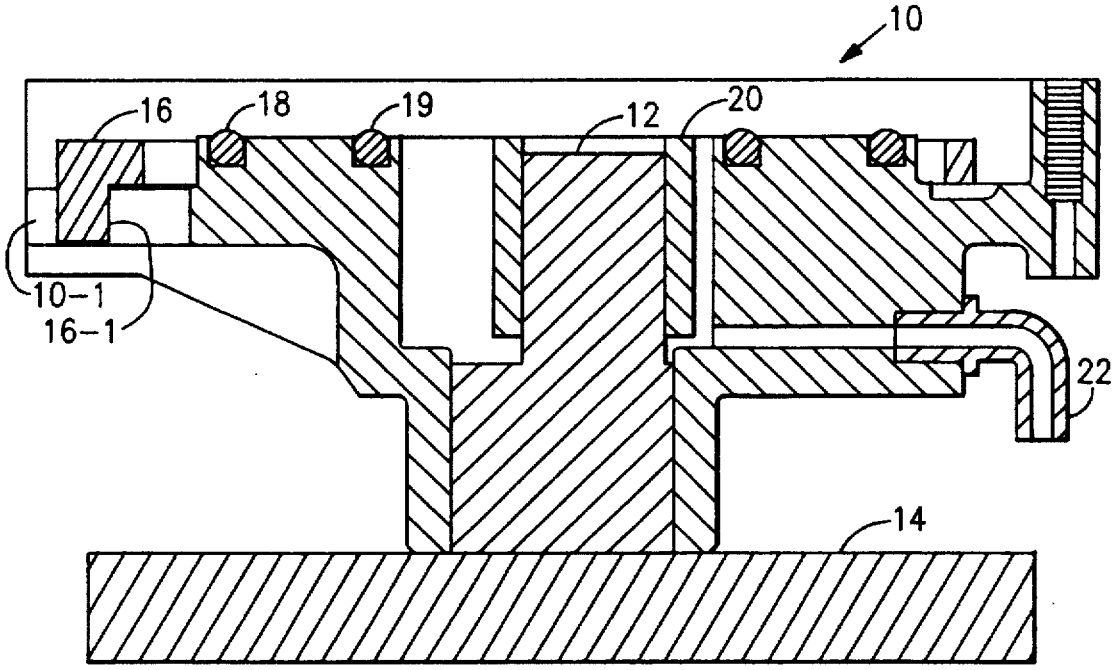
FIG. 2 shows the addition of structural elements to the crankcase of FIG. 1.

In FIG. 1, the numeral 12 designates a fixture corresponding to a crankshaft and which is secured to pallet 14. Crankcase 10 is placed over fixture 12 onto pallet 14. This properly orients and locates crankcase 10 for the automatic equipment. With crankcase 10 in place on fixture 12, Oldham coupling 16 is set in place with key 16-1 being located in slot 10-1 and a diametrically located key (not illustrated) being located in a corresponding slot (10-7). It should be noted that solely for the Oldham coupling 16 and the associated slots the sectional view in the various figures is not taken along a diameter. Seals 18 and 19 are placed in grooves 10-2 and 10-3, respectively, in crankcase 10 slider block 20 is placed on eccentric portion 12-1 of fixture 12 and drain tube 22 is secured in bore 10-4 of crankcase 10. The assembly described so far is illustrated in FIG. 2.

Figure 3:
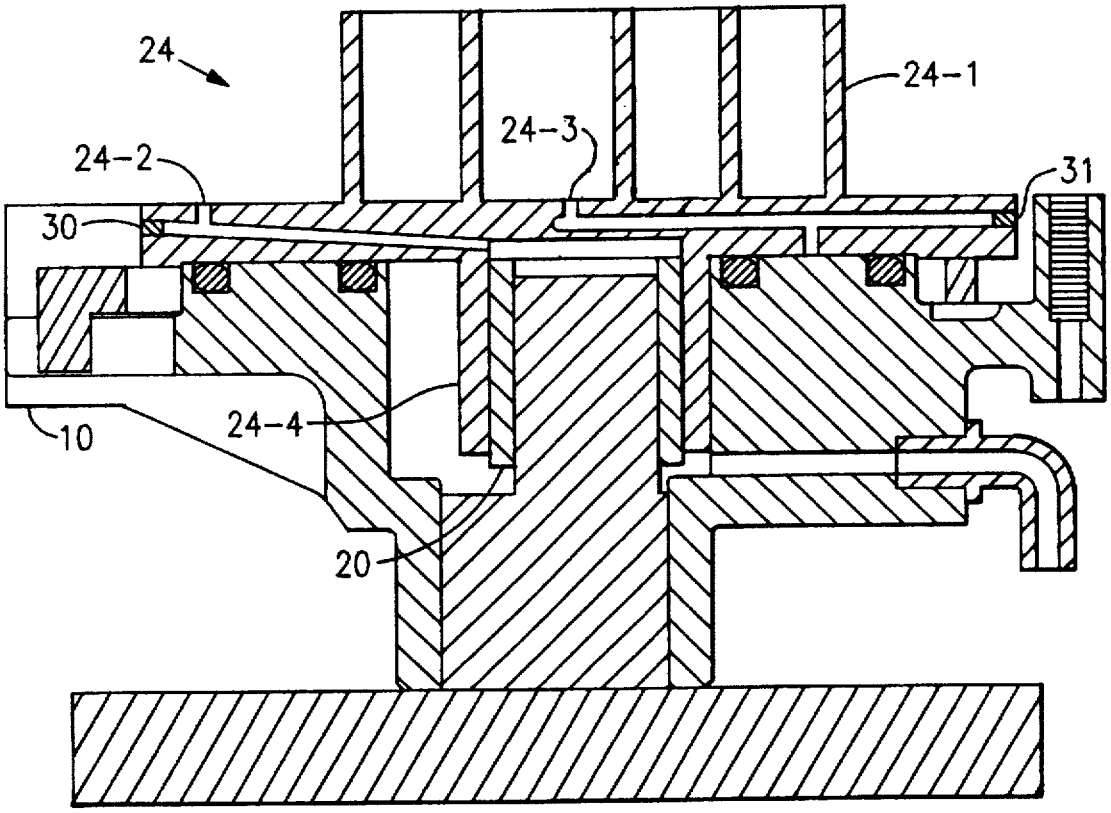
FIG. 3 shows the addition of the orbiting scroll to the structure of FIG. 2.

Orbiting scroll 24 has a wrap 24-1, internal passages 24-2 and 24-3 and a hub 24-4. Passage 24-2 provides a fluid path from the interior of hub 24-4 to the interface between the orbiting scroll 24 and the fixed scroll 40 and supplies lubricant delivered by the crankcase to the interface for lubrication thereof. Passage 24-3 is used to communicate intermediate pressurized fluid from the compression process to axial compliance structure defined in part by seals 18 and 19. Plugs 30 and 31 seal drill holes made in forming passages 24-2 and 24-3, respectively. As illustrated in FIG. 3, hub 24-4 is placed over slider block 20 and is supported by crankcase 10 and seals 18 and 19. Slots (not illustrated) receive keys (not illustrated) on Oldham coupling 16, as is conventional.

Figure 4:
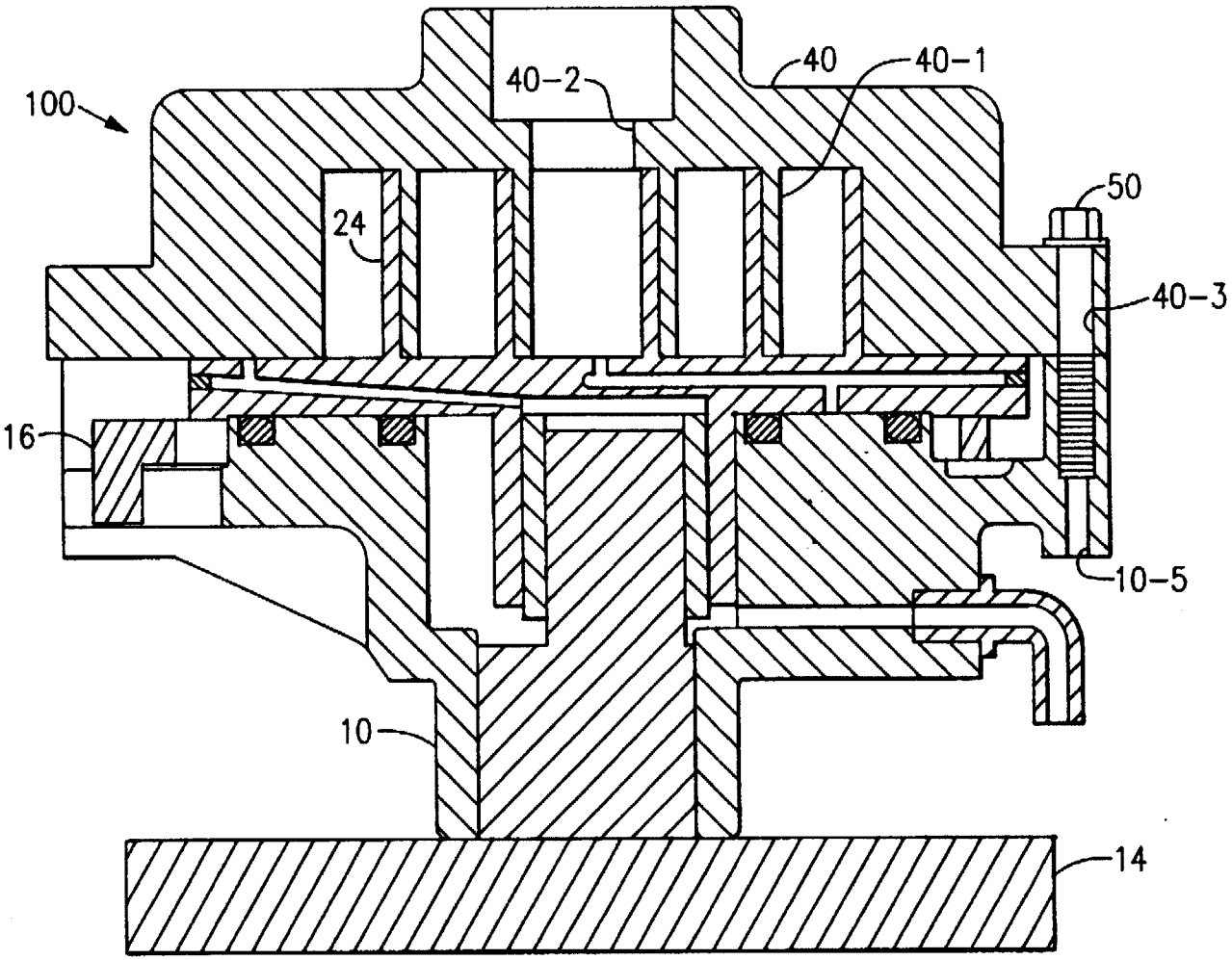
FIG. 4 shows the addition of the fixed scroll to the structure of FIG. 3.

Fixed scroll 40 has a wrap 40-1, an outlet 40-2 and a plurality of circumferentially spaced bolt holes 40-3 corresponding to threaded bores 10-5 in crankcase 10. Fixed scroll 40 is placed on crankcase 10 such that wrap 40-1 operatively engages wrap 24-1 and bolt holes 40-3 align with threaded bores 10-5. Bolts 50 are placed in bolt holes 40-3 and started in threaded bores 10-5 to locate fixed scroll 40 with respect to crankcase 10. The resultant pump cartridge assembly 100 is illustrated in FIG. 4.

Figure 5:
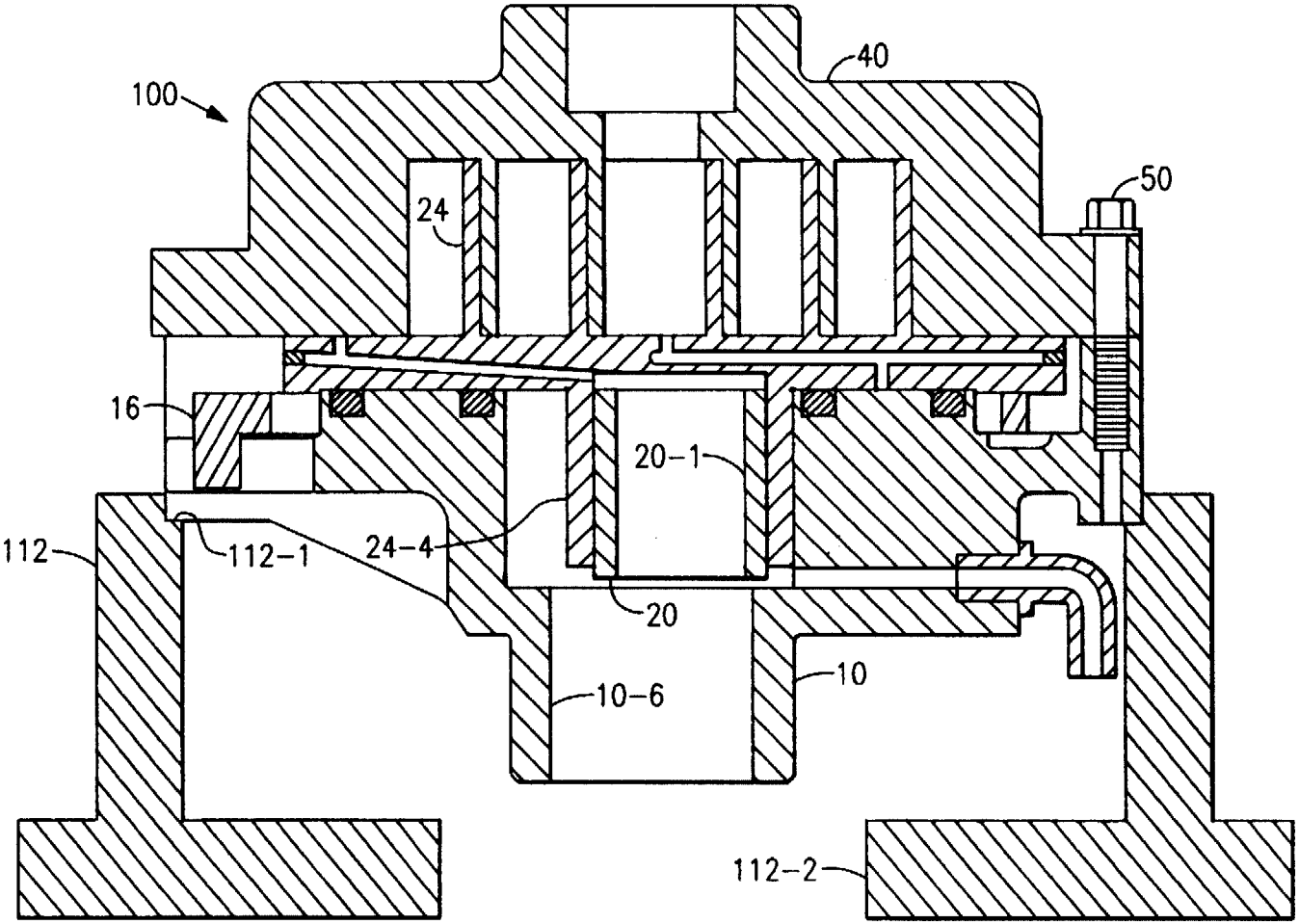
FIG. 5 shows the subassembly of FIG. 4 located on a different fixture.

Oldham coupling 16 coacting with orbiting scroll 24 and crankcase 10 limits orbiting scroll 24 to an orbiting motion with respect to crankcase 10. Accordingly, the movement of the hub 24-4 and the slider block 20 received therein is held to an orbiting motion such that slider block 20 does not align with crankshaft bore 10-6 and cannot drop from the hub 24-4 when assembly 100 is removed from fixture 12. As illustrated in FIG. 5, assembly 100 is removed from fixture 12 and placed in fixture 112. Fixture 112 has a shoulder 112-1 which supports crankcase 10 and thereby assembly 100. Opening 112-2 in fixture 112 affords access to crankshaft bore 10-6 and slider block bore 20-1.

At an automatic station, crankcase bore 10-6 is engaged through crankcase bore 112-2 and pump assembly 100 is lifted from fixture 112 into an align and torque device. The bolts 50 are untorqued. The align and torque device determines the location of fixed scroll features and crankcase features and moves the crankcase and fixed scroll to an aligned position and torques bolts 50 to secure crankcase 10 and fixed scroll 40 in their proper relative position.

Figure 6:
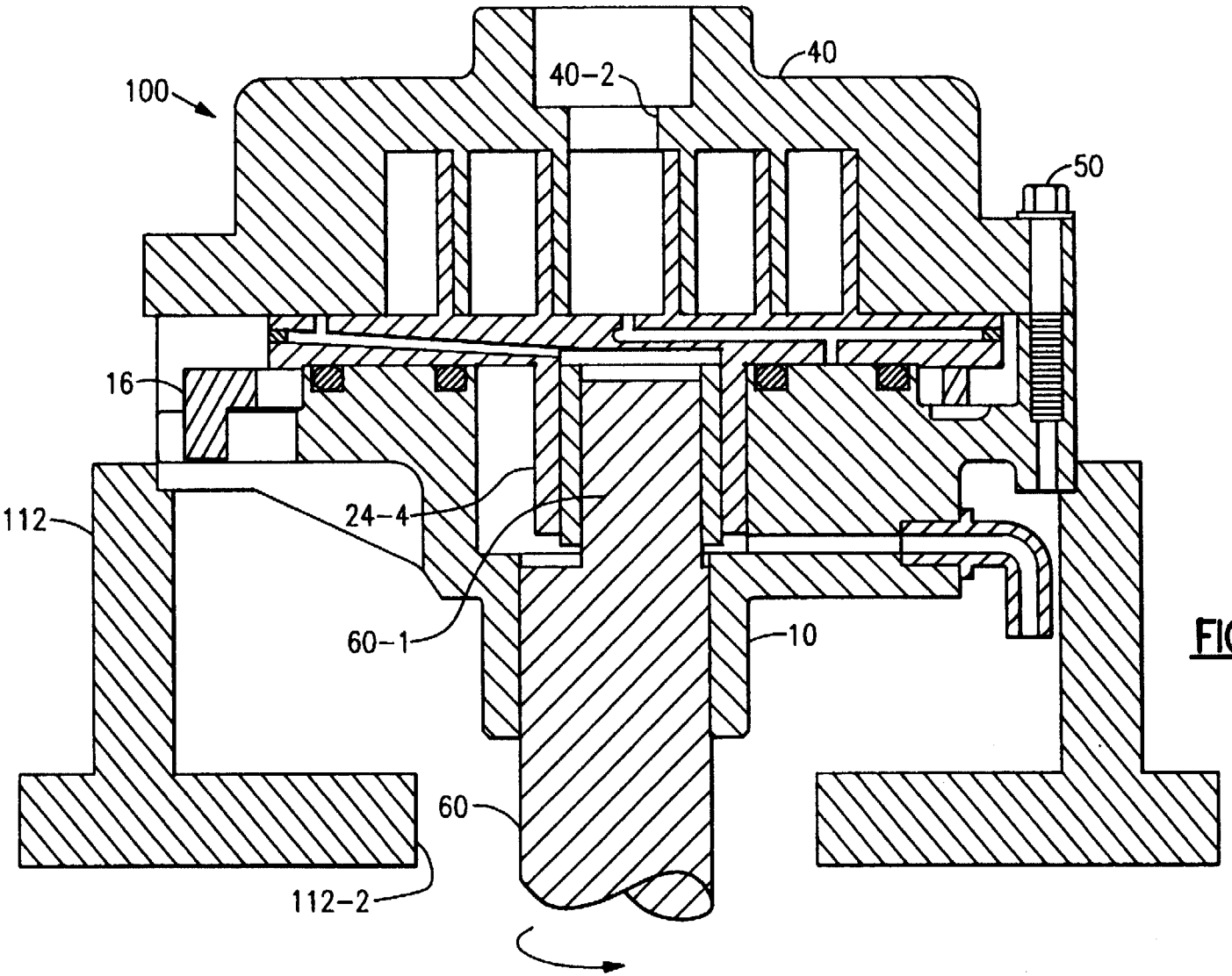
FIG. 6 shows the testing of the subassembly of FIG. 5.
Figure 11:
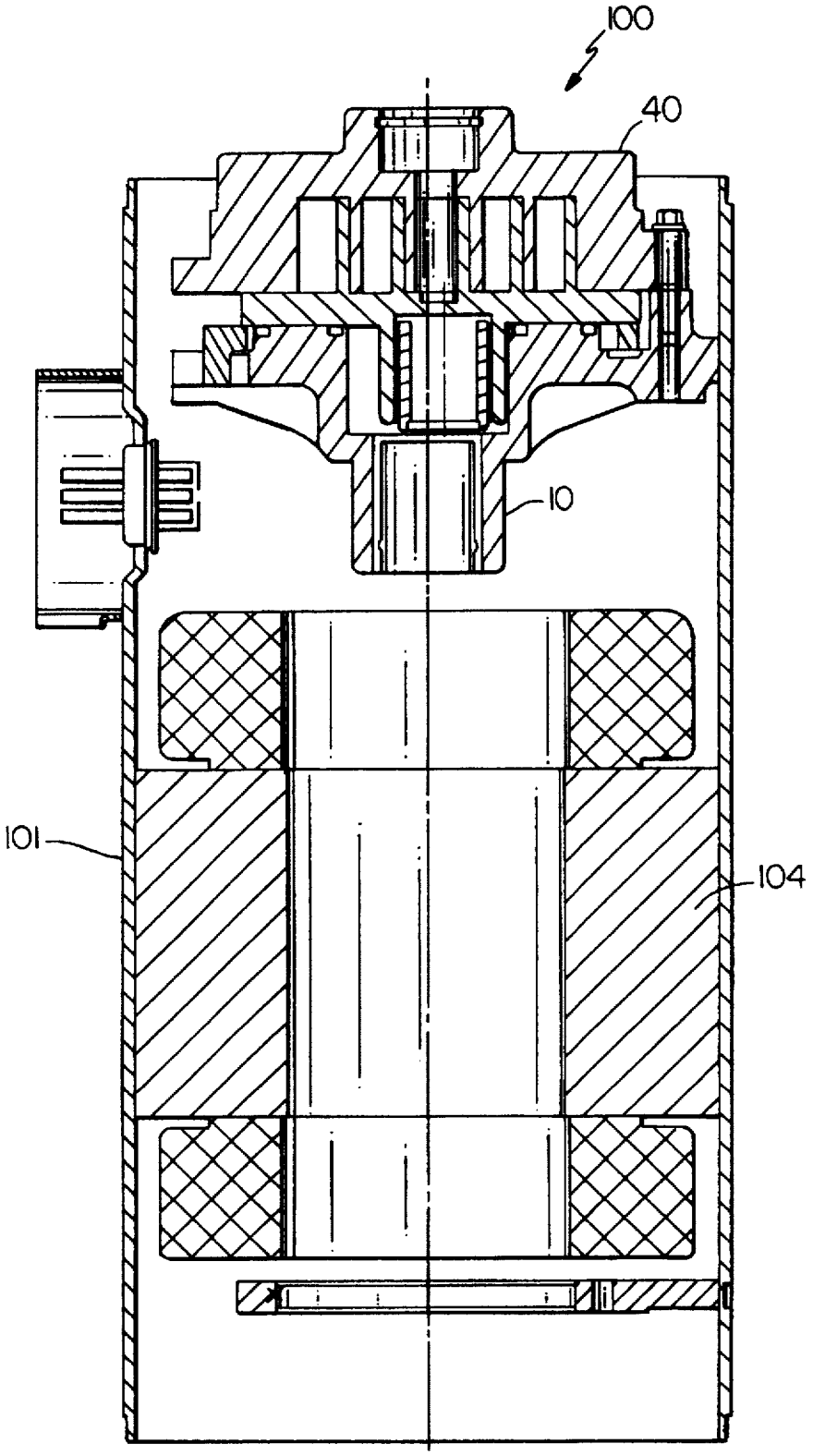
FIG. 11 is a sectional view of a partially assembled compressor according to the teachings of the present invention and U.S. Pat. No. 5,042,150.

When pump cartridge assembly 10 is assembled, fixture 112 is used to present pump cartridge assembly 100 for testing. Specifically, as shown in FIG. 6, a crankshaft 60 is inserted in bore 10-6 such that eccentric pin portion 60-1 is received in bore 20-1 of slider block 20. Crankshaft 60 is rotated causing slider block 20 to rotate therewith and causing orbiting scroll 24 to orbit, if the pump cartridge assembly 100 is properly assembled, thereby permitting evaluation of the assembly. If assembly 100 operates correctly, it can then be removed from fixture 112 and placed and secured in the shell of a hermetic scroll compressor. FIG. 11 shows pump cartridge assembly 100 secured in shell 101 according to the teachings of U.S. Pat. No. 5,042,150 which secures stator 104 in place in shell 101 and uses the stator as a reference for locating other members. If the assembly 100 does not operate correctly, it is removed from fixture 112 and disassembled and examined to determine the cause of the problem. Faulty parts are discarded and the other parts used to assemble other pump cartridges.

The assembly described with respect to FIGS. 1–6 is done with automatic equipment. The steps in assembling the pump cartridge assembly 100 are set forth in FIG. 7. In block 200, which corresponds to FIG. 1, the crankcase 10 is loaded onto fixture 12. Fixture 12 is located on pallet 14 and thereby provides a fixed, known location for automatically placing crankcase 10 which is automatically fed to the equipment placing crankcase 10 on fixture 12. As indicated by block 201, corresponding to FIG. 2, with crankcase 10 located by fixture 12, Oldham coupling 16, seals 18 and 19, slider block 20 and oil drain tube 22 may be automatically set in place. As indicated by block 202, corresponding to FIG. 3, the orbiting scroll 24 is then picked up and placed on crankcase 10 such that hub 24-4 receives slider block 20 and keys on Oldham coupling 16 are received in corresponding slots in orbiting scroll 24. Fixed scroll 40 is then automatically placed on crankcase 10, as indicated by block 203 which corresponds to FIG. 4. In placing fixed scroll 40 on crankcase 10, the wraps 24-1 and 40-1 of orbiting and fixed scrolls 24 and 40, respectively, will be in engagement. With fixed scroll 40 properly located on crankcase 10, bolt holes 40-3 are aligned with bores 10-5 and bolts 50 can be automatically started, as indicated by block 204. The resulting pump cartridge assembly 100 can then be removed from the assembly fixture 12 and placed on the fixture 112 as indicated by block 205 which corresponds to FIG. 5.

Figure 7:
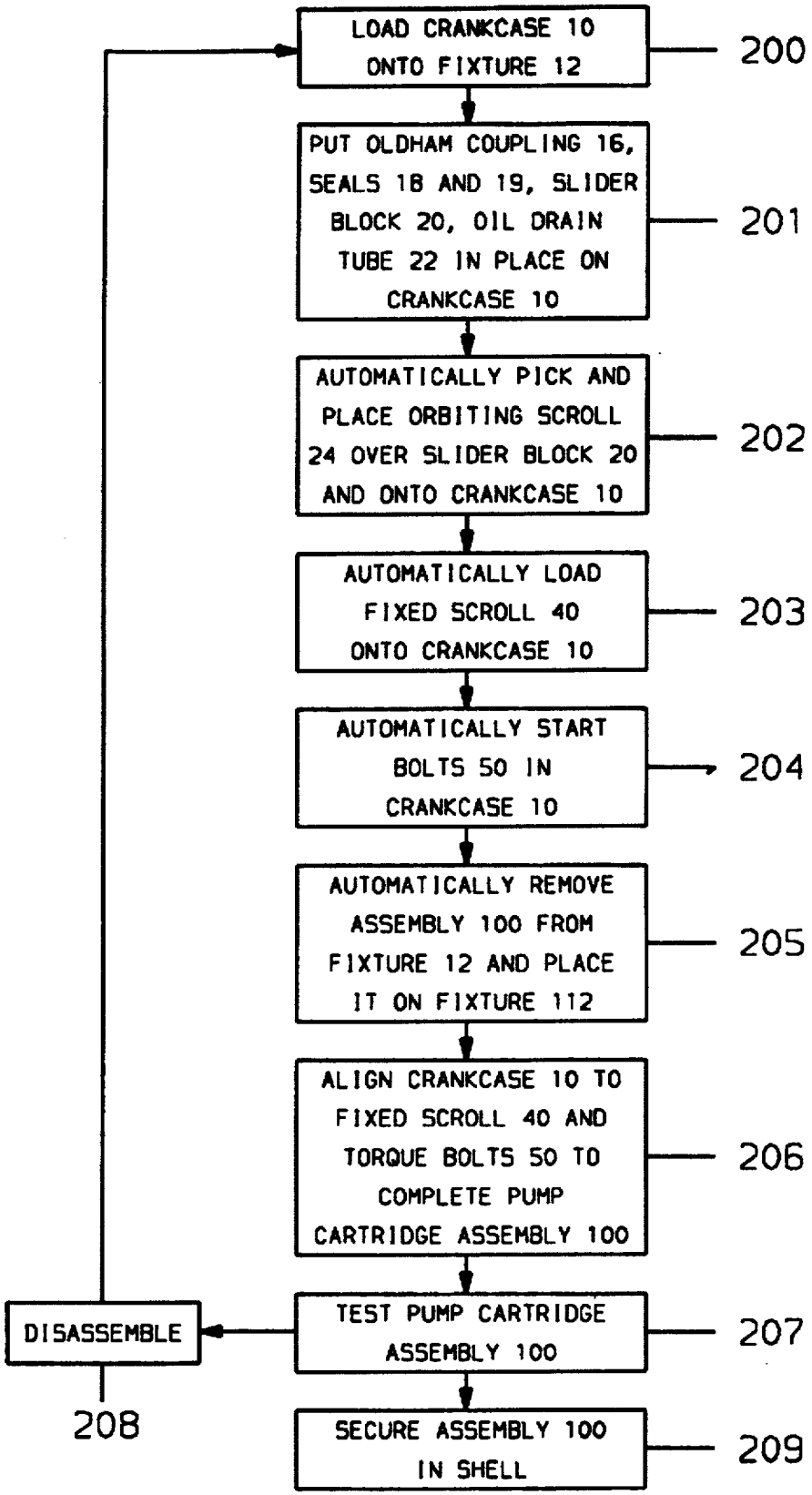
FIG. 7 is a flow diagram of the assembly process.
Figure 8:
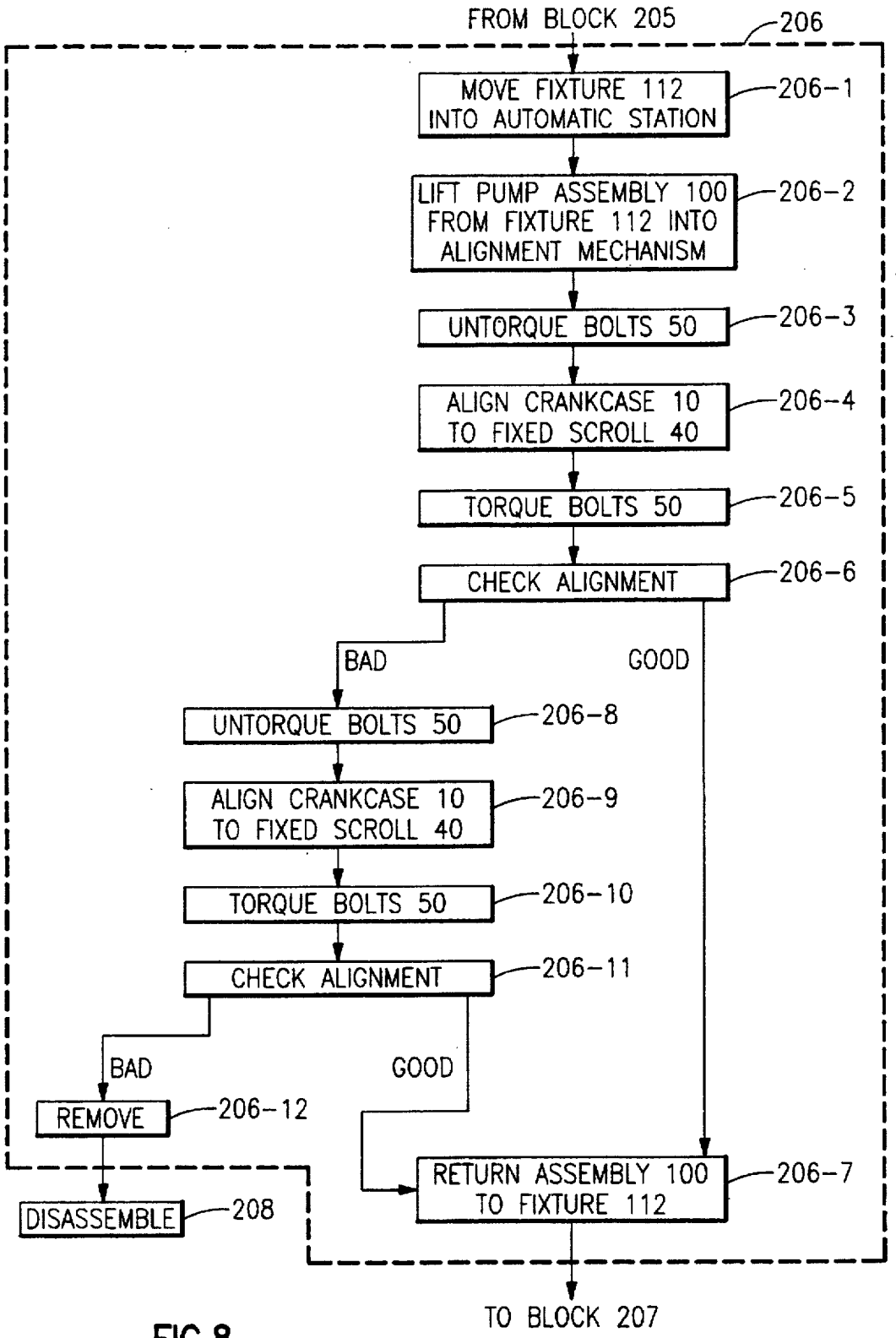
FIG. 8 is a detailed flow diagram of a block in the assembly process of FIG. 7.

As indicated by block 206 bolts 50 are tightened thereby securing fixed scroll 40 to crankcase 10 and securing the orbiting scroll 24, slider block 20, Oldham coupling 16 and seals 18 and 19 in place. As shown in FIG. 8, block 206 of FIG. 7 is made up of a plurality of steps indicated by blocks 206-1 and 206-12. Initially, fixture 112 is moved into an automatic station, as indicated by block 206-1, where pump assembly 100 is lifted from fixture 112 into an alignment mechanism, as indicated by block 206-2. The bolts 50 are untorqued, as indicated by block 206-3, to permit movement of the members, and crankcase 10 is aligned to fixed scroll 40, as indicated by bloc 206-4. With crankcase 10 aligned to fixed scroll 40, bolts 50 are torqued, as indicated by block 206-5, and the alignment is checked, as indicated by block 206-6. If the alignment is good, assembly 100 is returned to fixture 112, as indicated by block 206-7. If the checking of the alignment, as indicated by block 206-6, is bad, bolts 50 are untorqued, as indicated by block 206-8, and crankcase 10 is again aligned to fixed scroll 40, as indicated by block 206-9. With crankcase 10 aligned to fixed scroll 40, bolts 50 are torqued, as indicated by block 206-10. The alignment is checked again, as indicated by block 206-11. If the alignment is good, the assembly 100 is returned to fixture 112, as indicated by block 206-7. If the alignment is bad, assembly 100 is removed, as indicated by block 206-12, and disassembled, as indicated by block 208. With pump cartridge assembly 100 in place on fixture 112, the eccentric pin 60-1 of crankshaft 60 may then be inserted into bore 20-1 of slider block 20. When crankshaft 60 is rotated, hub 24-4 and thereby oribiting scroll 24 will be driven via slider bock 20 and will be held to an orbiting motion by Oldham coupling 16 if the parts are properly assembled. The pump cartridge assembly 100 is thus tested as indicated by block 207 which corresponds to FIG. 6. Testing may include measuring the starting and running torque level and vibration (signature analysis). The test is stopped if torque exceeds a set level or if vibration is unacceptable. If the pump cartridge assembly 100 does not function properly during the test, it may be readily taken apart and reassembled, as indicated by block 208 and should be contrasted with a situation where the structure corresponding to the pump cartridge assembly is secured in the shell. If the pump cartridge assembly 100 operates properly during the test, crankcase 20 and thereby the structure which defines pump cartridge assembly 100 can be secured in the shell of a hermetic compressor as taught in U.S. Pat. No. 5,042,150, and illustrated in FIG. 11, or by another suitable method as indicated by block 209.

Figure 9:
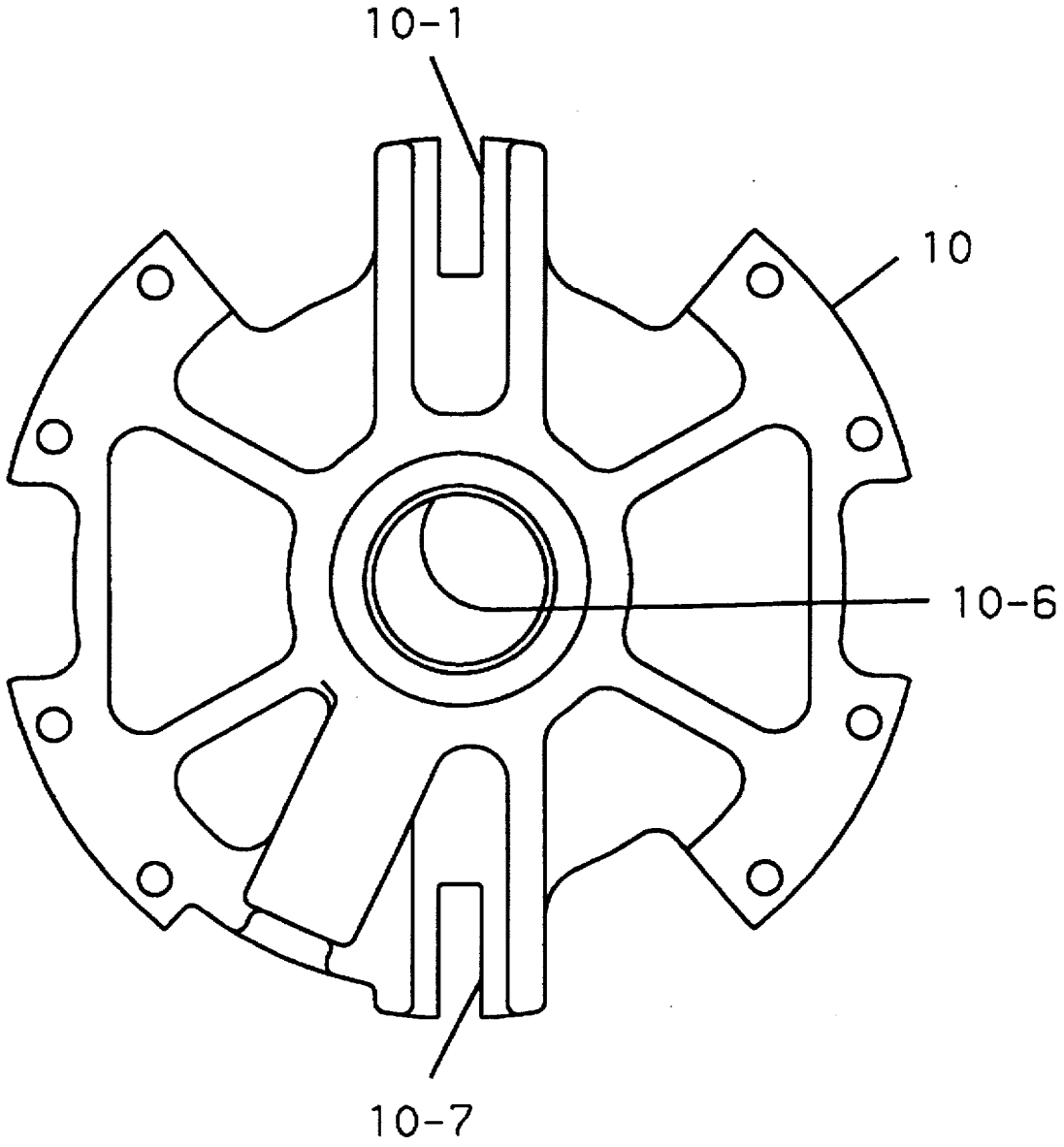
FIG. 9 is a view of the bottom a hub side of the crankcase.
Figure 10:
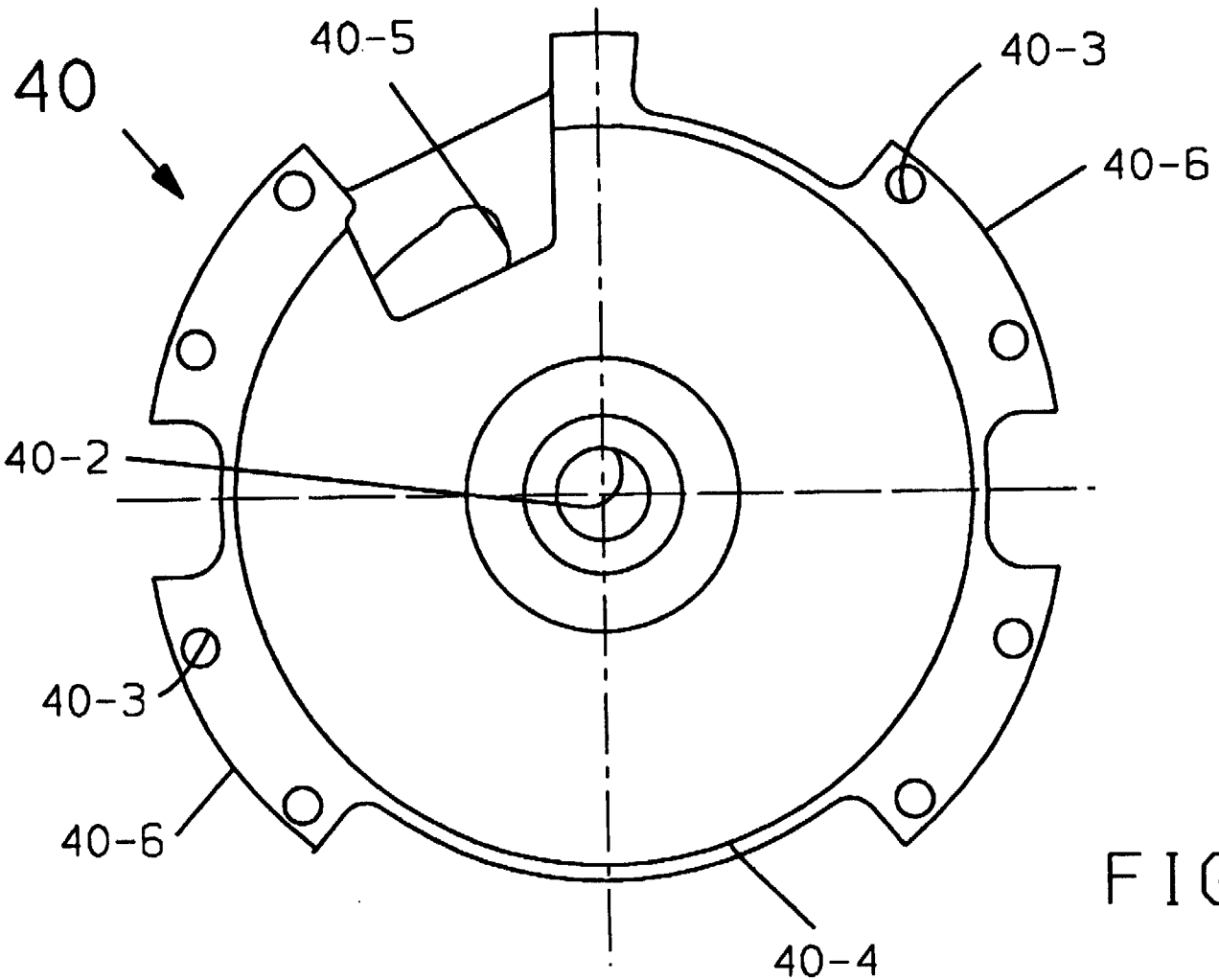
FIG. 10 is a view of the outlet side of the fixed scroll.

From the foregoing description, it should be evident that the precise positioning of the members consistent with the machining tolerances required for the scroll wraps, etc. requires structure to insure the proper positioning of the members. Referring to FIG. 9, slots 10-1 and 10-7 coact with keys of the Oldham coupling 16 with slot 10-1 being precisely located and serving as a reference. Additionaly, bore 10-6 has a precise diameter. Referring now to FIG. 10, fixed scroll 40 has a precision outer diameter represented by cylindrical surface 40-4 and a radial stop 40-5. A plurality of lugs 40-6 are the locations for the bolt holes 40-3.

In loading pump cartridge assembly 110 on fixture 112 as illustrated in FIG. 5 and represented by box 205 of FIG. 7, centering and rotational positioning of crankcase 10 onto fixture 112 is achieved by locating the center of crankcase 10 through machined slot 10-1 and through the diameter of bore 10-6 which are referenced by the automated equipment. The fixed scroll 40 is positioned with reference to the precision outer diameter represented by cylindrical surface 40-4 and angularly located by radial stop 40-5. Automatic equipment moves crankcase 10 and fixed scroll 40 to align the position of crankcase 10 and the position of fixed scroll 40. The bolts 50 are then torqued to secure crankcase 10 in the proper position with respect to fixed scroll 40. After torquing the bolts, the fixed scroll position is checked with reference to a true diametrical position to determine whether the parts are within an acceptable tolerance range.

Although a preferred embodiment of the present invention has been illustrated and described, other changes will occur to those skilled in the art. For example, although described in terms of a scroll compressor, it is suitable for other hermetic compressor assemblies. It is therefore intended that the scope of the present invention is to be limited only by the scope of the appended claims.

What is claimed is:

1. A method of assembling a pump cartridge *as a subassembly* for insertion *of said subassembly* in a scroll compressor comprising the steps of:

removably locating a crankcase on an assembly fixture;

locating an Oldham coupling in operative engagement with the crankcase;

locating a slider block on the fixture;

locating an orbiting scroll in operative engagement with the slider block and Oldham coupling and supported by the crankcase;

locating a fixed scroll in operative engagement with the orbiting scroll and supported by the crankcase; and securing the second scroll *directly* to the crankcase to form a pump cartridge assembly.

2. [The] *A* method of [claim 1 further including the steps of] *assembling a pump cartridge for insertion in a scroll compressor comprising the steps of*:

*removably locating a crankcase on an assembly fixture;*

*locating an Oldham coupling in operative engagement with the crankcase;*

*locating a slider block on the fixture;*

*locating a first scroll defining an orbiting scroll in operative engagement with the slider block and Oldham coupling and supported by the crankcase;*

*locating a second scroll in operative engagement with the orbiting scroll and supported by the crankcase;*

*securing the second scroll to the crankcase to form a pump cartridge assembly;* removing the pump cartridge assembly from the assembly fixture;

placing the pump cartridge assembly on a test fixture;

engaging a drive shaft to the slider block;

rotating the shaft; *and* determining if the pump cartridge assembly operates satisfactorily.

3. The method of claim 2 further including the step of securing a pump cartridge assembly which operates satisfactorily in a hermetic shell of a scroll compressor.

4. The method of claim 1 wherein the step of locating the [fixed] *second* scroll further includes the step of angularly positioning the [fixed] *second* scroll with respect to the crankcase.

5. A method of assembling a pump cartridge for insertion in a scroll compressor comprising the steps of:

removably locating a crankcase on an assembly fixture;

locating an Oldham coupling in operative engagement with the crankcase;

locating a slider block on the fixture;

locating *a first scroll defining* an orbiting scroll in operative engagement with the slider block and Oldham coupling and supported by the crankcase;

locating a [fixed] *second* scroll in operative engagement with the orbiting scroll and supported by the crankcase;

precisely aligning the [fixed] *second* scroll on the crankcase;

measuring the position of the crankcase and [fixed] *second* scroll;

relatively moving the crankcase and [fixed] *second* scroll to a desired position based on the measurement; and securing the [fixed] *second* scroll to the crankcase to form a pump cartridge assembly.

6. The method of claim 5 further including the steps of:

removing the pump cartridge assembly from the assembly fixture;

placing the pump cartridge assembly on a test fixture;

engaging a drive shaft to the slider block;

rotating the shaft;

determining if the pump cartridge assembly operates satisfactorily.

7. The method of claim 6 further including the step of securing a pump cartridge assembly which operates satisfactorily in a hermetic shell of a scroll compressor.

8. The method of claim 5 wherein the step of locating the [fixed] *second* scroll further includes the step of angularly positioning the [fixed] *second* scroll with respect to the crankcase.

9. A method of assembling a pump cartridge *as a subassembly* for insertion *of said subassembly* in a scroll compressor comprising the steps of:

removably locating a crankcase on an assembly fixture;

locating an Oldham coupling in operative engagement with the crankcase;

locating an orbiting scroll in operative engagement with the Oldham coupling and supported by the crankcase;

locating a fixed scroll in operative engagement with the orbiting scroll and supported by the crankcase; and securing the fixed scroll *directly* to the crankcase to form a pump cartridge assembly.

10. [The] *A* method of [claim 9 further including the steps of] *assembling a pump cartridge for insertion in a scroll compressor comprising the steps of*:

*removably locating a crankcase on an assembly fixture;*

*locating an Oldham coupling in operative engagement with the crankcase;*

*locating a first scroll defining an orbiting scroll in operative engagement with the Oldham coupling and supported by the crankcase:*

*locating a second scroll in operative engagement with the orbiting scroll and supported by the crankcase;*

*securing the second scroll to the crankcase to form a pump cartridge assembly;* removing the pump cartridge assembly from the assembly fixture;

placing the pump cartridge assembly on a test fixture;

engaging a drive shaft to the pump cartridge assembly;

rotating the shaft; *and* determining if the pump cartridge assembly operates satisfactorily.

11. The method of claim 10 further including the step of securing a pump cartridge assembly which operates satisfactorily in a hermetic shell of a scroll compressor.

12. The method of claim 9 wherein the step of locating the [fixed] *second* scroll further includes the step of angularly positioning the [fixed] *second* scroll with respect to the crankcase.

13. A method of assembling a pump cartridge for insertion in a scroll compressor comprising the steps of:

[a] removably locating a crankcase on an assembly fixture;

locating an Oldham coupling in operative engagement with the crankcase;

locating *a first scroll defining* an orbiting scroll in operative engagement with the Oldham coupling and supported by the crankcase;

locating a [fixed] *second* scroll in operative engagement with the orbiting scroll and supported by the crankcase;

precisely aligning the [fixed] *second* scroll on the crankcase;

measuring the position of the crankcase and [fixed] *second* scroll;

relatively moving the crankcase and [fixed] *second* scroll to a desired position based on the measurement; and securing the [fixed] *second* scroll to the crankcase to form a pump cartridge assembly.

14. The method of claim 13 further including [he] *the* steps of:

removing the pump cartridge assembly from the assembly fixture;

placing the pump cartridge assembly on a test fixture;

engaging a drive shaft to the pump cartridge assembly;

rotating the shaft;

determining if the pump cartridge assembly operates satisfactorily.

15. The method of claim 14 further including the step of securing a pump cartridge assembly which operates satisfactorily in a hermetic shell of a scroll compressor.

16. The method of claim 13 wherein the step of locating the [fixed] *second* scroll further includes the step of angularly positioning the [fixed] *second* scroll with respect to the crankcase.

* * * * *